(12) United States Patent
Santahuhta

(10) Patent No.: US 6,765,932 B1
(45) Date of Patent: Jul. 20, 2004

(54) METHOD AND APPARATUS FOR SYNCHRONIZING A DATA STREAM

(75) Inventor: Raimo Santahuhta, Lieto (FI)

(73) Assignee: Nokia Technology GmbH, Pforzheim (DE)

( * ) Notice: Subject to any disclaimer, the term of this patent is extended or adjusted under 35 U.S.C. 154(b) by 0 days.

(21) Appl. No.: 09/400,773

(22) Filed: Sep. 22, 1999

(30) Foreign Application Priority Data

Sep. 22, 1998 (FI) .................................................. 982040

(51) Int. Cl.⁷ ................................................. H04J 3/06
(52) U.S. Cl. ........................ 370/503; 370/545; 375/371
(58) Field of Search ................. 370/350, 503, 370/507, 518, 545; 375/353, 355, 358, 359, 354, 371, 372; 713/400

(56) References Cited

U.S. PATENT DOCUMENTS

| | | | |
|---|---|---|---|
| 4,692,893 A | | 9/1987 | Casper |
| 4,873,703 A | * | 10/1989 | Crandall et al. ............. 375/371 |
| 5,388,074 A | * | 2/1995 | Buckenmaier ......... 365/189.05 |
| 5,422,914 A | * | 6/1995 | Snyder ........................ 375/354 |
| 5,487,092 A | * | 1/1996 | Finney et al. ................ 375/354 |
| 5,621,775 A | * | 4/1997 | Etienne ....................... 375/372 |
| 5,642,387 A | * | 6/1997 | Fukasawa .................... 375/372 |
| 5,696,768 A | | 12/1997 | Harriman et al. |
| 5,706,299 A | | 1/1998 | Baydar et al. .............. 371/69.1 |
| 5,793,227 A | * | 8/1998 | Goldrian ....................... 326/94 |
| 5,809,032 A | | 9/1998 | Weeber ...................... 370/517 |
| 5,905,766 A | * | 5/1999 | Nguyen ...................... 375/354 |
| 5,909,563 A | * | 6/1999 | Jacobs ........................ 710/305 |
| 6,269,136 B1 | * | 7/2001 | Hansen et al. .............. 375/354 |

FOREIGN PATENT DOCUMENTS

EP 0840203 5/1998

OTHER PUBLICATIONS

Texas Instruments Inc., 4–by–4 Registers Files with 3–state Outputs, Mar. 1988.*
European Patent Office Search Report dated Apr. 3, 2002.

* cited by examiner

*Primary Examiner*—Hassan Kizou
*Assistant Examiner*—Christopher M Swickhamer
(74) *Attorney, Agent, or Firm*—Ware, Fressola, Van Der Sluys & Adolphson LLP

(57) ABSTRACT

An electronic apparatus is used for synchronizing a data stream synchronized with a first clock signal with a second clock signal. It comprises a plurality of parallel latches wherein successive states of the data stream are written cyclically in synchronization with the first clock signal into the parallel latches and wherein the states written into the parallel latches in synchronization with the second clock signal are cyclically read. The apparatus also indicates the validity latch.

7 Claims, 3 Drawing Sheets

METHOD AND APPARATUS FOR SYNCHRONIZING A DATA STREAM

BACKGROUND OF THE INVENTION

The invention relates in general to the synchronization of a digital data stream with a given clock signal. In particular the invention relates to synchronization in a situation where the data signal to be synchronized involves a clock signal which is not the same as the clock signal with which the data stream is to be synchronized.

DISCUSSION OF RELATED ART

Many digital apparatuses process data streams, or chronological sequences of successive states. A data stream may be one bit wide, in which case its state is represented by bit value 0 or 1, or it may be N bits wide, where N is a positive integer, in which case the state has $2^N$ possible values. When we say that a data stream is synchronized, we mean that the changes between the successive states take place in a given fixed relation to a certain clock signal. We can, for example, specify that the clock signal is a regular square pulse, in which case a change between two successive states is allowed only on the rising and/or falling edge of the clock signal. The term rising edge means a change in the clock signal from logical state 0 into logical state 1, and, conversely, the term falling edge means a change from logical state 1 into logical state 0.

Problems arise in a situation in which a data stream is synchronized with its own clock signal but said data stream should also be processed in an apparatus or part of an apparatus controlled by another clock signal. Two different clock signals are hardly ever in synchronization with each other but they both may have momentarily varying frequencies, pulse ratios and phases. Thus, a data stream synchronized with one clock signal is not constantly synchronized with another clock signal, which may cause errors in the processing of the data signal.

SUMMARY OF THE INVENTION

An object of the present invention is to provide a method and an apparatus with which a data stream synchronized with a first clock signal can be transformed such that it is synchronized with a second clock signal.

This and other objects of the invention are achieved by writing the states of the data stream in synchronization with a first clock signal consecutively into latches which are read in synchronization with a second clock signal so that the validity of the states read is checked in conjunction with the reading of the latches.

The method according to the invention is characterized in that successive states of a data stream are written cyclically in synchronization with a first clock signal into parallel storage units, states written into the parallel storage units are read cyclically in synchronization with a second clock signal, and it is indicated whether the state read from a given storage unit is valid or not.

The invention also concerns an electronic apparatus which is characterized in that it comprises a plurality of parallel latches, means for writing successive states of the data stream in synchronization with a first clock signal into parallel latches, means for cyclically reading the states written into the parallel latches in synchronization with a second clock signal, and means for indicating the validity of a state read from a given latch.

According to the invention, it is formed a synchronizing element comprised of parallel latches into which the data stream to be synchronized is directed. There are at least two parallel latches, but there may also be more of them. The successive states of the data stream are written cyclically into the latches in synchronization with a first clock signal such that a certain first state is written into the first latch, a is following second state is written into the second latch and so forth until the state following the state written into the last latch is again written into the first latch. In conjunction with writing it is stored an indication that the latch contains an unread state.

States stored in the latches are read cyclically in synchronization with a second clock signal. In conjunction with the reading it is checked if the state in the latch has already been read. If it has been read, it will not be read anew but will be indicated erroneous. The successive states read without errors form a data stream synchronized with the second clock signal. When a state stored in a particular latch has been read once, an indication of this is stored lest the same state be read again.

BRIEF DESCRIPTION OF THE DRAWING

The invention will now be described in more detail with reference to the preferred embodiments presented by way of example and to the accompanying drawings wherein.

Like elements in the drawings are denoted by like reference numbers.

DETAILED DESCRIPTION OF PREFERRED EMBODIMENTS

Figure 1:
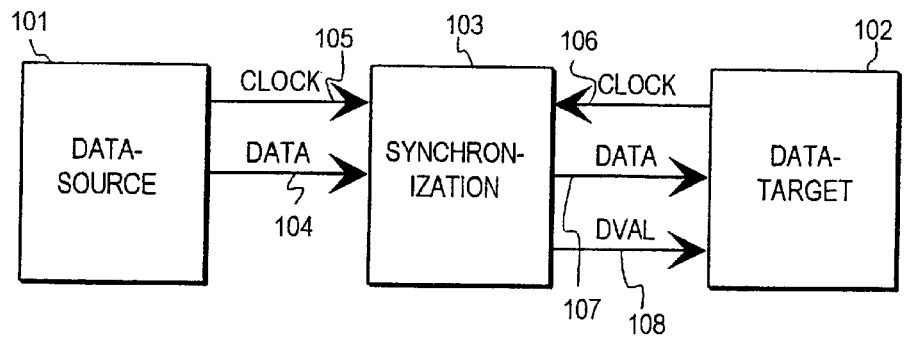
FIG. 1 depicts a first principle of applying the invention.

FIG. 1 shows an asynchronous data source 101, synchronous data target 102 and there between a synchronizing element 103 the operation of which is in accordance with the invention. The asynchronous nature of the source 101 means that it produces to line 104 a data stream which is synchronized with a first clock signal seen on line 105 but not with a second clock signal seen on line 106, which is the synchronization signal generated and used by the data target 102. The aim is to process the data stream read from line 104 in the synchronizing element 103 such that it can be written to line 107 in synchronization with the second clock signal. The validity of a particular state in the data stream written to line 107 is indicated by line 108 (Dval) the function of which will be discussed in more detail later on. The detailed structures of the data source 101 and data target 102 are unimportant from the point of view of the invention.

Figure 2:
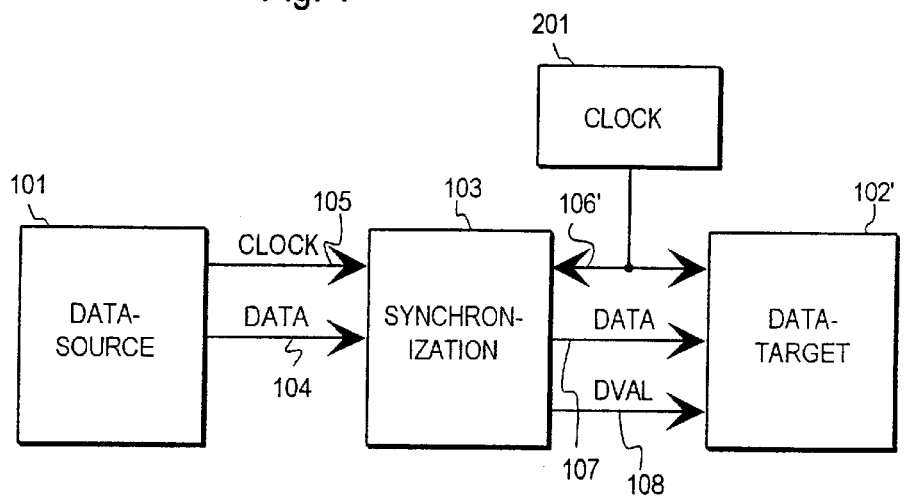
FIG. 2 depicts a second principle of applying the invention.

FIG. 2 is otherwise identical to FIG. 1 but the clock signal seen on line 106' originates not from the data source 102' but from a separate clock signal generator 201 from which it is conducted to both the data target 102' and synchronizing element 103. A similar variant could be disclosed for the first clock signal, i.e. the first clock signal seen on line 105 could be taken from a separate clock signal generator not synchronized with the data target and/or external clock signal generator controlling it (if it were, the synchronizing element 103 would be needless).

Figure 3:
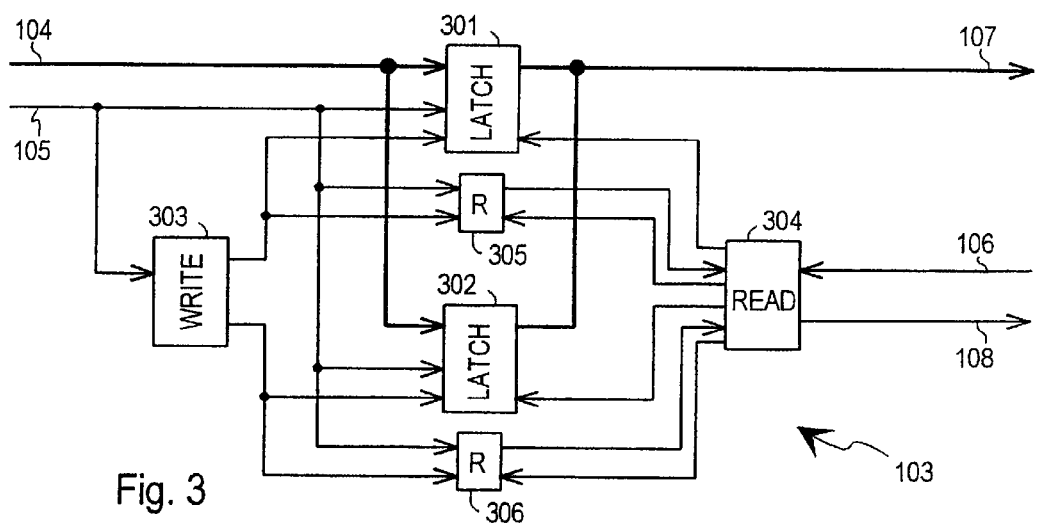
FIG. 3 depicts a more detailed implementation.

FIG. 3 shows a more detailed implementation of the synchronizing element 103. It comprises two parallel latches 301 and 302. In this embodiment of the invention, a latch means a circuit which has a data input, data output, rising-edge-triggered write clock input, falling-edge-triggered read clock input, and a write enable input. On the rising edge of the signal brought to the write clock input the latch stores the state at the data input if the enable input is active. The stored state can be read from the data output on the falling edge of the signal brought to the read clock input. The data inputs of both latches are coupled to the asynchronous data stream line 104, and the write clock input is coupled to the first clock signal line 105. The data outputs of both latches are coupled to the synchronous data stream line 107. The enable inputs of the latches are controlled separately by a write counter 303 which receives a control signal from line 105; the operation of the write counter 303 will be explained in more detail later on. The read clock inputs of the latches are controlled by a control logic and read counter block 304 which receives a control signal from line 106 and which further produces for line 108 the information about the validity of a particular state in the data stream on line 107.

The arrangement shown in FIG. 3 also includes a first register 305 and a second register 306 which are logically connected to the latches so that register 305 corresponds to latch 301 and register 306 corresponds to latch 302. In this embodiment of the invention, a register means a circuit which has a set input, set enable input, reset input, and an output. When the set input is active (in logical state 1) the register stores a logical value 1 if the set enable input is active. When the reset input is active the register stores a logical value 0. The storing of logical value 1 into the register or line is called setting the register or line, and the storing of logical value 0 is called a reset. The logical value of the register can at any time be read from the output 0. The set inputs of both registers are coupled to the first clock signal line 105. The set enable inputs of both registers are connected together with the write enable input of the latch corresponding to the register. A control logic and read counter block 304 controls separately the reset inputs of both registers and reads the values stored by the registers as well as sets or resets line 108.

For simplicity, data lines 104 and 107 in FIG. 3 are depicted by single lines only, which can be interpreted to mean that the data streams are just one bit wide and latches 301 and 302 store only one bit value at a time. This, however, does not limit the invention but the widths of the data lines can be freely chosen, the latches being such that they store all the data line status bits simultaneously.

In the description below, one and the same reference number will be used of a certain signal line as well as of the signal seen on that line. In the arrangement of FIG. 3, the next state is clocked out from the asynchronous data source on the falling edge of the first clock signal 105 so that it can be seen on data line 104. The state of data line 104 is written on the rising edge of the first clock signal 105 into the latch pointed to by the write counter 303, i.e. the latch whose write enable input EN1 or EN2 is active. At the same time, the state of the register corresponding to that latch is set to 1 and the write counter 303 is incremented so as to point to the next latch.

On the falling edge of the second clock signal 106 it is checked which latch the read counter in the control logic and read counter block 304 is pointing to and if the register corresponding to that latch is set. If the register is set, the control logic and read counter block 304 sets line 108, reads to line 107 the value of the latch pointed to by the read counter, resets the register corresponding to the latch and increments the read counter so as to point to the next latch. If the register is not set the control logic and read counter block 304 resets line 108. The state seen on line 107 is clocked into the synchronous data target 102 on the rising edge of the second clock signal only if line 108 is set. So, the state of line 108 indicates whether the state of data line 107 corresponds to the correctly read state of the latch or not.

Figure 4:
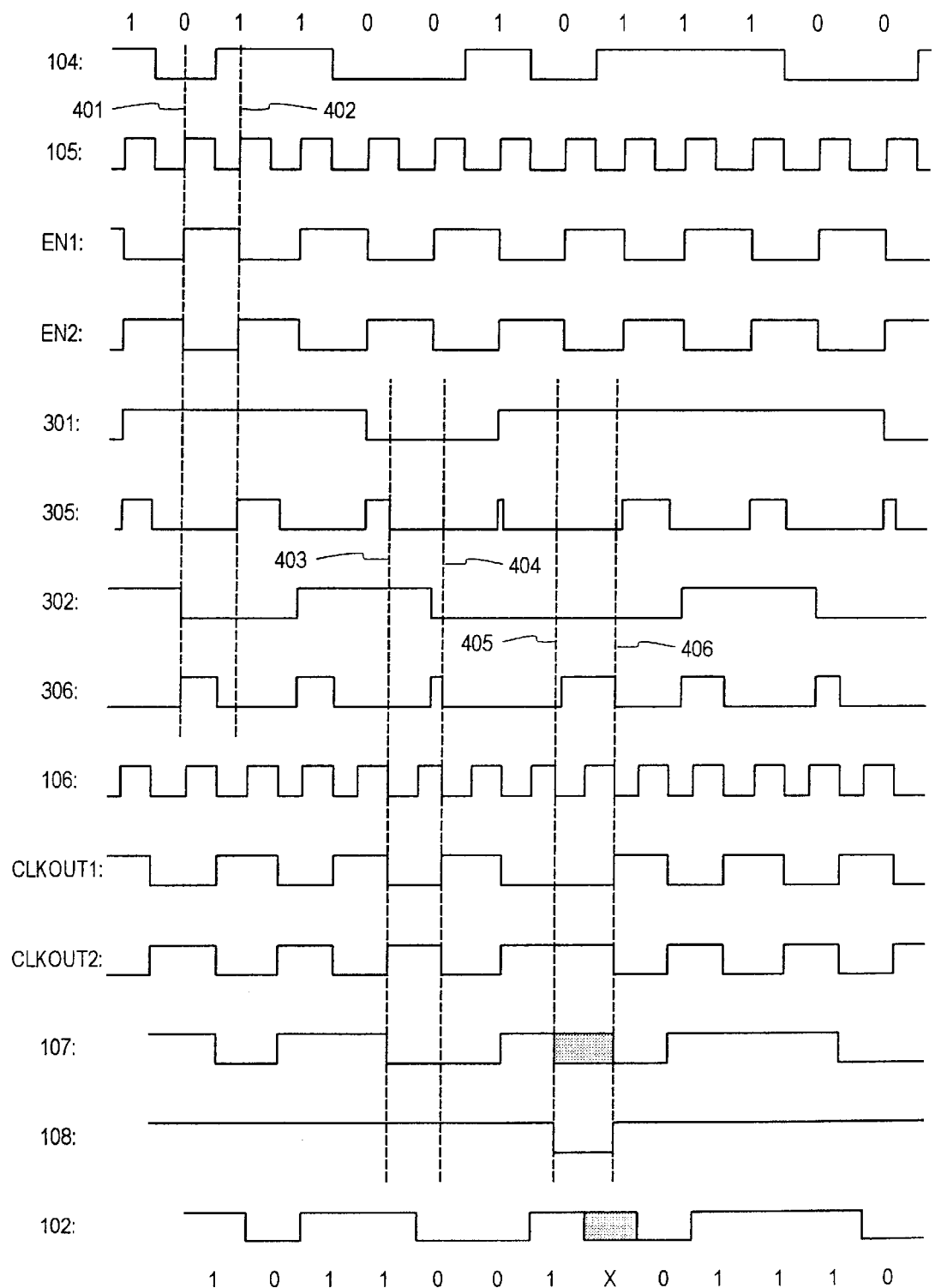
FIG. 4 depicts a mutual timing of signals in the implementation of FIG. 3.

The timing diagram in FIG. 4 illustrates the operation of the circuit according to FIG. 3 in an exemplary situation. The reference numbers of the signals depicted in FIG. 4 correspond to the reference numbers of lines or circuits depicted in FIGS. 1 and 3. FIG. 4 assumes that data line 104 is one bit wide and on that data line there can be seen a data stream sequence which comprises in chronological order the bit values 1011001011100. The data stream is synchronized with clock signal 105 so that the state detected on data line 104 changes on the falling edge of clock signal 105, corresponding to clocking out of states from the asynchronous data source, as explained above. By comparing clock signal 105 with clock signal 106 it is seen that they are not in synchronization with each other.(for example, clock signal 106 has 14 active pulses over the period examined whereas clock signal 105 has only 13).

At moment 401 it is examined the behavior of signals 104, 105, EN1 and EN2 and latches 301 and 302 as well as registers 305 and 306. This is the rising edge of the first clock signal 105, so no changes take place in data signal 104 at this moment. The write enable signal EN2 of latch 302 has until now been active, so the state "0" seen on data line 104 is written into latch 302 and the corresponding register 306 is set. No changes take place in the states of latch 301 and the corresponding register. At moment 402, the write enable signal EN1 of latch 301 has been active, so the state "1" seen on data line 104 is written into latch 301 and the corresponding register 305 is set.

Moments 403 and 404 correspond to two successive falling edges of the second clock signal 106. At moment 403 it is seen that the read counter points to a first latch 301 (signal CLKOUT1 is active). It is associated with a first register 305, which is set. The control logic and read counter block sets line 108 (which in this case was already set), reads the value "0" of the first latch 301 into line 107, resets the register 305 corresponding to the latch, and increments the read counters CLKOUT1 and CLKOUT2 so that they point to the next latch. On the next falling edge of the clock signal, i.e. at moment 404, it is examined the behavior of a second latch 302 and the corresponding register 306. Also in this case it is seen that the register is set, so the control logic and read counter block again sets line 108, reads the value "0" of the second latch 302 into line 107, resets the register 306 corresponding to the latch, and increments the read counters CLKOUT1 and CLKOUT2 so that they point to the next latch.

At moment 405 it is again examined the second latch 302 and the corresponding register 306. Now it is seen that register 306 is not set, so the control logic and read counter block resets line 108. The read counters CLKOUT1 and CLKOUT2 are not incremented to point to the next latch and values are not read from either of the latches into line 107; this is represented by the shaded area of signal 107 in FIG. 4. Since the read counters were not incremented, it will still be examined the second latch 302 and the corresponding register 306 on the next falling edge 406 of the second clock signal 107. Between moments 405 and 406 the read counter has set register 306, so the control logic and read counter block sets line 108, reads the value "0" of the second latch 302 into line 107, resets register 306 corresponding to the latch and increments the read counters CLKOUT1 and CLKOUT2 so that they point to the next latch.

Signal 102 in FIG. 4 corresponds to the data stream clocked into the data target. As explained above, the state of line 107 is clocked into the data target on the rising edge of the second clock signal 106 if line 108 is set. In FIG. 4, the successive states 1-0-1-1-0-0-1 of line 107 are clocked into the data target normally. However, the rising edge of the second clock signal 106 appears between moments 405 and 406, resetting line 108. On this rising edge the state of line 107 is not clocked into the data target, as depicted by the shaded area and letter X in the drawing. On the next rising edge of the second clock signal 106 line 108 is again set, so the states 0-1-1-1-0 and so on are clocked into the data target normally.

In FIG. 4, the mean frequency of the second clock signal 106, or the read clock, is slightly higher than that of the first clock signal 105, or the write clock. Consequently, the device attempts during a certain period of time to read into line 107 and further into the data target 102 more bit values than what has been written into line 104 from the data source. The inescapable result of this is that certain read operations will fail, i.e. during a read attempt it will be detected that the register in question is not set, whereby line 108 has to be reset and no state can be clocked into the data target during one read clock cycle. The failed read attempts, however, can be managed by means of internal arrangements within the data target, which, as such, are known to persons skilled in the art. From the point of view of data integrity it would be more detrimental if the frequency of the write clock were higher than the frequency of the read clock. In that case, the data source would provide line 104 with more bit values than what could be read into line 107 and further into the data target 102 during a certain period of time, which would result in lost bit values. However, the frequency of the write clock may momentarily exceed the frequency of the read clock; this will be explained in more detail later in conjunction with the description of FIG. 5.

To compensate for the frequency difference between the read and write clocks it is of course possible to add to the device according to the invention a known circuit which measures the frequency difference between the read and write clocks over a certain period of time and on the basis of the measurement result instructs one or both of the circuits generating the clock signals to change the frequency of the clock signal.

For simplicity, FIG. 4 assumes that the pulse ratios of both clock signals are about 50%, i.e. one clock cycle is divided into an active and a passive cycle, which have nearly the same width. This does not limit the invention but the clock signal pulse ratios can be freely chosen. The clock signal phases need not have any mutual relationship, although from the point of view of reliable operation of the circuit it is advantageous that the rising edge of the write clock and the falling edge of the read clock do not coincide. FIG. 4 shows that between moments 404 and 405 the rising edge of the write clock leads only slightly the falling edge of the read clock so that register 305 will be set only for a very short duration of time. Since the setting and resetting of the register involve certain finite rise and fall times, set and reset instructions which are very close to each other can leave the register in an indefinite state. However, this problem can be solved by using fast registers and, if necessary, an auxiliary circuit which extends the time difference between two nearly simultaneous state changes.

Figure 5:
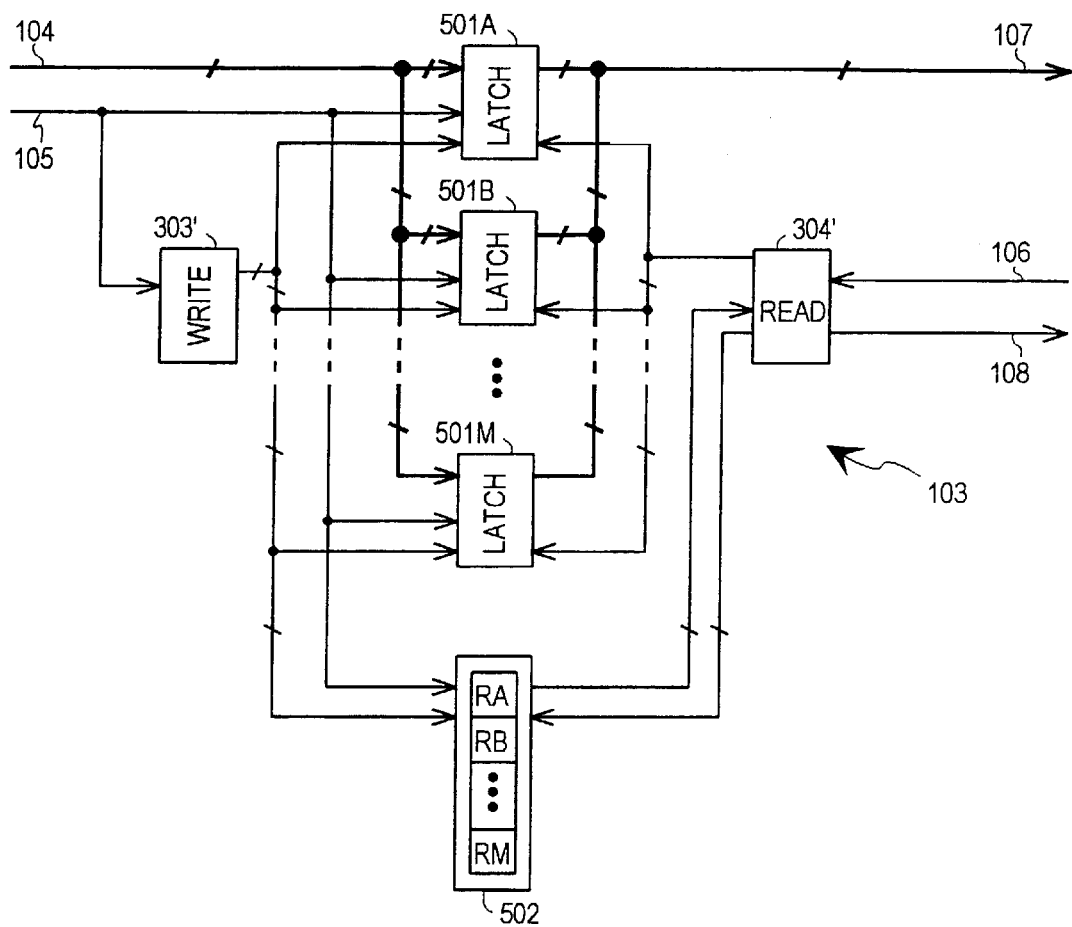
FIG. 5 depicts a generalization of the implementation of FIG. 3.

FIG. 5 shows a generalization of the implementation of FIG. 3. It comprises M parallel latches 501A, 501B . . . 501M, where M is a positive integer. There are also M registers which in the drawing are compiled into one register block 502; from the point of view of the invention it is naturally insignificant whether the registers are located in connection with the latches or somewhere else. A write counter 303' and control logic and read counter block 304' may be otherwise identical to those in FIG. 3 but are arranged so as to count from 1 to M and point to one latch and the corresponding register on each step.

The generalization of FIG. 5 is naturally a little more complex and space-consuming than the implementation of FIG. 3, but it has a few essential advantages. Among other things, it allows a greater momentary error increasing the write frequency, because as the write frequency increases it is possible to write the states of the asynchronous data stream into the registers without very quickly encountering the register from which the control logic and read counter block 304 has not yet read the previous written state.

The embodiments of the invention depicted in FIGS. 3 and 5 do not, as such, provide protection against a situation where the write frequency is higher than the read frequency for so long a time that the write counter has time to write a new state into a given latch before the control logic and read counter block has read the previous state written into the latch. As the control logic and read counter block reads a given state from a latch, it has no way of knowing whether a previously stored state in that latch has been replaced, or "overwritten", by a new one before the previous state was read. Overwriting results in that one state is missing from the data stream received by the data target, whereby some higher-level data structure may prove erroneous (for example, a checksum for a given data frame does not match, so that the whole data frame has to be rejected).

However, the device according to the invention can easily be equipped with an auxiliary part with which overwriting can be detected as soon as it happens. Each register can be provided with a second register used to indicate overwriting. When writing a given state into a latch the write counter checks whether the register corresponding to that latch is already set. If the register is already set, it means that the state in the latch has not yet been read and overwriting is about to occur. In such a case the write counter writes the state into the latch normally, but in addition to the register, it also sets the associated second register. When reading the latch value the control logic and read counter block sees that the second register, too, is set, whereby it can send to the data target information indicating that overwriting has occurred. This information can be used e.g. to equalize clock frequencies. The quicker the information about overwriting is obtained, the quicker the device can respond to it and the less there will be erroneous higher-level data structures. Having read the overwritten state the control logic and read counter block can reset both registers because in spite of the overwriting a successful read operation has now been performed on the latch.

The embodiments of the invention described above are meant as examples only and do not limit the invention. For example, it is known that in digital circuits the polarities of signals can be changed if at the same time it is made sure that the effect of the change of polarity is taken into account everywhere by means of suitable negation circuits. In conjunction with a polarity change, the effects of the rising and falling edges of a signal on the operation of the circuit usually change. Also, the use of registers may as well be defined such that when a given state is written into a given latch, this in indicated by resetting the corresponding register, and when a state is read, the corresponding register is set.

What is claimed is:

1. An electronic apparatus for synchronizing a data stream synchronized with a first clock signal with a second clock signal, characterized in that it comprises:

a plurality of parallel latches;

means for writing successive states of the data stream cyclically in synchronization with the first clock signal into the parallel latches;

means for reading states written into the parallel latches cyclically in synchronization with the second clock signal, and means for indicating the validity of a state read from a given latch separately for each of said plurality of latches;

said apparatus further characterized in that:

said means for indicating the validity of a state read from a given latch include in association with each latch a first register which has two allowed states;

said means for writing the successive states of the data stream are arranged to indicate the writing of a given state into a given latch by setting a corresponding first register to a first allowed state, and said means for cyclically reading the states written into the parallel latches are arranged to indicate the reading of a given state from a given latch by setting said corresponding first register to a second allowed state.

2. The electronic apparatus of claim 1, characterized in that the means for indicating the validity of a state read from a given latch also include in association with each latch a second register which has two allowed states, whereby said means for writing the successive states of the data stream are arranged so as to indicate the overwriting of a given state into a given latch by setting a corresponding second register to a first allowed state, and said means for cyclically reading the states written into the parallel latches are arranged so as to detect, on the basis of said first allowed state of the second register, that a given state read from a given latch was written over a previous state.

3. An electronic apparatus for synchronizing a data stream synchronized with a first clock signal with a second clock signal, characterized in that it comprises:

a plurality of parallel latches;

means for writing successive states of the data stream cyclically in synchronization with the first clock signal into the parallel latches;

means for reading states written into the parallel latches cyclically in synchronization with the second clock signal, and means for indicating the validity of a state read from a given latch separately for each of said plurality of latches;

said apparatus further characterized by:

an input data line and an output data line;

a clock signal line in connection with the input data line, and a clock signal line in connection with the output data line;

an indication line;

a first latch and a second latch;

said first latch and said second latch further comprising, a data input, a data output, a write clock input, a read clock input and a write enable input;

a first register and a second register;

said first register and said second register further comprising, a set input, a set enable input, a reset input and an output;

a write counter which has a clock input as well as a first output and a second output, and a control logic and read counter block which has a clock input, an indication output, a first register output, a first register input, a first latch output, a second register output, a second register input and a second latch output, whereby the input data line is coupled to the data inputs of the first and second latches; the output data line is coupled to the data outputs of the first and second latches; the indication line is coupled to the indication output of the control logic and read counter block; the clock signal line associated with the input data line is coupled to the write clock inputs of the first and second latches, to the set inputs of the first and second registers, and to the clock input of the write counter; the clock signal line associated with the output data line is coupled to the clock input of the control logic and read counter block; the first output of the write counter is coupled to the write enable input of the first latch and to the set enable input of the first register; the second output of the write counter is coupled to the write enable input of the second latch and to the set enable input of the second register; and the first register output of the control logic and read counter block is coupled to the reset input of the first register, the first register input is coupled to the output of the first register, the first latch output is coupled to the read clock input of the first latch, the second register output is coupled to the reset input of the second register, the second register input is coupled to the output of the second register and the second latch output is coupled to the read clock input of the second latch.

4. A method for synchronizing a data stream synchronized with a first clock signal with a second clock signal, characterized in that:

successive states of a data stream are written cyclically in synchronization with a first clock signal into parallel storage units;

states written into the parallel storage units are read cyclically in synchronization with a second clock signal, and it is indicated separately for each storage unit whether a state read from a said storage unit is valid or not;

wherein:

the next state in the data stream is clocked out from the data stream source on the falling edge of the first clock signal;

a state in the data stream is written on the rising edge of the first clock signal into the latch pointed to by a certain write counter, and a certain register corresponding to that latch is set, and the write counter is incremented so as to point to the next latch;

on the falling edge of the second clock signal it is checked which latch a certain read counter is pointing to and whether the register corresponding to that latch is set; whereby, if the register is set, a certain indication line is set, the value of the latch pointed to by the read counter is read into a certain output line, the register corresponding to the latch is reset and the read counter is incremented so as to point to the next latch; and if the register is not set, the indication line is reset, and on the rising edge of the second clock signal, the state seen on the output line is clocked into a certain data target if the indication line is set, and the state is not clocked into the data target if the indication line is reset.

5. The method of claim 4, characterized in that:

a data stream synchronized with said second clock signal is formed of the states read from the parallel storage units, and an indication stream is formed corresponding to the data stream synchronized with said second clock signal, whereby each of the states in the indication stream indicates whether the corresponding data stream state is valid or not.

6. A method for synchronizing a data stream synchronized with a first clock signal with a second clock signal, characterized in that:

successive states of a data stream are written cyclically in synchronization with a first clock signal into parallel storage units, states written into the parallel storage units are read cyclically in synchronization with a second clock signal, and it is indicated separately for each storage unit whether a state read from a said storage unit is valid or not;

wherein:

the validity of a state read from a given latch is indicated through a state of a latch-specific register which has two allowed states, the writing of a given state into a given latch is indicated by setting a corresponding latch-specific register to a first allowed state, and the reading of a given state from a given latch is indicated by setting a corresponding latch-specific register to a second allowed state.

7. The method of claim 6, characterized in that:

a data stream synchronized with said second clock signal is formed of the states read from the parallel storage units, and an indication stream is formed corresponding to the data stream synchronized with said second clock signal, whereby each of the states in the indication stream indicates whether the corresponding data stream state is valid or not.

* * * * *

UNITED STATES PATENT AND TRADEMARK OFFICE
CERTIFICATE OF CORRECTION

PATENT NO. : 6,765,932 B1
DATED : July 20, 2004
INVENTOR(S) : Raimo Santahuhta

It is certified that error appears in the above-identified patent and that said Letters Patent is hereby corrected as shown below:

<u>Title page,</u>
Item [57], ABSTRACT,
Line 11, after "validity" -- of a state read form a -- should be inserted.

Signed and Sealed this

Fifth Day of October, 2004

JON W. DUDAS
*Director of the United States Patent and Trademark Office*